United States Patent [19]

Marshall

[11] 4,251,492
[45] Feb. 17, 1981

[54] PURIFICATION PROCESS

[75] Inventor: Alan Marshall, Macclesfield, England

[73] Assignee: Ciba-Geigy Corporation, Ardsley, N.Y.

[21] Appl. No.: 57,153

[22] Filed: Jul. 12, 1979

[30] Foreign Application Priority Data

Jun. 7, 1978 [GB] United Kingdom ............... 26466/78

[51] Int. Cl.$^3$ ............................................. B01D 53/34
[52] U.S. Cl. .................... 423/226; 423/571; 423/573 G; 210/765; 208/231
[58] Field of Search .......... 423/210, 224, 226, 573 R, 423/573 G, 571; 210/59, 60; 208/231

[56] References Cited

U.S. PATENT DOCUMENTS

| | | | |
|---|---|---|---|
| 2,644,002 | 6/1953 | Hoeberg | 260/326.5 |
| 2,977,439 | 5/1960 | Nicklin et al. | 208/231 |
| 3,035,889 | 5/1962 | Nicklin et al. | 423/226 X |
| 3,097,926 | 7/1963 | Nicklin et al. | 423/226 |
| 3,214,454 | 10/1965 | Blaser et al. | 260/429.9 |
| 3,441,379 | 4/1969 | Renault | 423/575 |
| 3,477,953 | 11/1969 | Carlson | 252/175 |
| 3,578,708 | 5/1971 | Carlson | 260/534 |
| 3,590,555 | 7/1971 | Wackernagel | 55/51 |
| 3,717,701 | 2/1973 | Carlson | 423/272 |
| 4,021,101 | 4/1977 | Geffers et al. | 260/502.4 R |
| 4,052,160 | 10/1977 | Cook et al. | 252/389 A |
| 4,060,594 | 11/1977 | Fenton et al. | 423/226 |
| 4,118,467 | 10/1978 | Sano et al. | 423/573 R |

FOREIGN PATENT DOCUMENTS

| | | |
|---|---|---|
| 846038 | 9/1976 | Belgium . |
| 1045373 | 12/1958 | Fed. Rep. of Germany . |
| 2131017 | 12/1972 | Fed. Rep. of Germany . |
| 2632774 | 2/1977 | Fed. Rep. of Germany . |
| 465889 | 5/1937 | United Kingdom . |
| 871233 | 6/1961 | United Kingdom . |
| 948270 | 1/1964 | United Kingdom . |
| 1201334 | 8/1970 | United Kingdom . |
| 1245758 | 9/1971 | United Kingdom . |
| 1508268 | 4/1978 | United Kingdom . |

OTHER PUBLICATIONS

Chemical Abstracts, 54, 23129$^6$, 1960.
Chemical Abstracts, 78, 86322b, 1973.
Nicklin, "Das Stretford-Verfahren zur Entfernung von Schwefel aus Gasen", Brennstoff Chemie, 50, T 24, 1969.
Zygmunt et al., "Preparation of Oxoalkanephosphonic Acids", Synthesis, 1978, pp. 609-612.
Chemical Abstracts, 31, 7778$^8$, 1937.
Chemical Abstracts, 48, 5206d, 1954.
Chemical Abstracts, 61, 8109f, 1964.
Chemical Abstracts, 82, 106176v, 1975.
Chemical Abstracts, 87, 52992r, 1977.

Primary Examiner—Earl C. Thomas
Attorney, Agent, or Firm—Luther A. R. Hall

[57] ABSTRACT

A process for the removal of hydrogen sulphide from gases or liquid hydrocarbons, comprising contacting the gas or liquid hydrocarbon with an aqueous alkaline solution, preferably having a pH value of 8 to 10, comprising (a) an anthraquinone disulphonic acid or a water-soluble sulphonamide thereof
(b) a compound of a metal which can exist in at least two valency states and
(c) a sequestering agent comprising a compound of formula I:

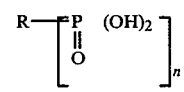

wherein R is an aliphatic residue containing from 1 to 12 carbon atoms and which is optionally substituted or interrupted by one or more hydroxy, or carboxyl groups; a carbonyl group, a phenyl group; or an aralkyl group containing 7 to 10 carbon atoms; and n is an integer of from 1 to 4; as well as salts, especially alkali metal and ammonium salts, and esters of compounds of formula I.

23 Claims, No Drawings

PURIFICATION PROCESS

The present invention relates to a purification process, especially to a process for removing hydrogen sulphide from gases or liquid hydrocarbons containing it as impurity.

A widely-used process for the removal of hydrogen sulphide from gases or liquid hydrocarbons is the so-called "Stretford Process". In this process, described in British Pat. No. 948270, the gas or liquid hydrocarbon is contacted with an aqueous alkaline solution of one or more anthraquinone disulphonic acids, a compound of a metal having at least two valency states and, optionally, a sequestering agent suitable for retaining such metal compounds in solution. In a recent development our copending U.S. patent applications Ser. Nos. 57,154 and 57,157 discloses novel anthraquinone sulphonamides which have proved to be at least as effective as or superior to the compounds used in British Pat. No. 948270 for the removal of hydrogen sulphide as sulphur from gases or liquid hydrocarbons. A particularly preferred metal is vanadium. Specifically recommended as sequestering agents are sodium potassium tartrate or other soluble tartrates, tartaric acid and ethylene diamine tetracetic acid.

In practice, it has been shown that the use of a sequestering agent is essential if loss of vanadium, by precipitation of a black deposit from the wash liquor is to be avoided. Moreover, practical experience has shown that citric acid is a more effective sequestering agent than the materials specifically recommended in British Pat. No. 948270.

However, citric acid, tartaric acid and the other sequestering agents known for use in the Stretford Process have the disadvantage that they are lost in the process due to their oxidation. As a consequence, their sequestering activity is lost and their replacement on a continuous basis is required. Moreover, known sequestering agents require to be used at a high sequesterant to metal ratio e.g. 2 mols of citric acid are required to sequester 1 mol of vanadium.

Surprisingly, we have now found that certain sequestering agents, namely those containing a phosphonic acid grouping, can be used at lower chelating ratios relative to metal and do not require to be added as frequently to the process system.

Accordingly, the present invention provides a process for the removal of hydrogen sulphide from gases or liquid hydrocarbons, comprising contacting the gas or liquid hydrocarbon with an aqueous alkaline solution, preferably having a pH value of 8 to 10, comprising (a) an anthraquinone disulphonic acid or a water-soluble sulphonamide thereof (b) a compound of a metal which can exist in at least two valency states and (c) a sequestering agent comprising a compound of formula I:

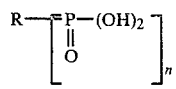

wherein R is an aliphatic residue containing from 1 to 12 carbon atoms and which is optionally substituted or interrupted by one or more hydroxy and/or carboxyl groups; a carbonyl group, a phenyl group; or an aralkyl group containing 7 to 10 carbon atoms; and n is an integer of from 1 to 4; as well as salts, especially alkali metal and ammonium salts, and esters of compounds of formula I.

The gas or mixture of gases to be treated according to the invention may contain, in addition to hydrogen sulphide, other pollutive gases such as certain carbon-, nitrogen-, and sulphur oxides, hydrogen, organic sulphur compounds or hydrogen cyanide which may or may not be removed by the process. The new process is also suitable for the removal of hydrogen sulphide from liquid hydrocarbons.

Aqueous alkaline solutions employed in the process of the invention contain one or more of the known isomers of anthraquinone disulphonic acid or their sulphonamide derivatives, preferably in amount of 1000–4000 ppm, especially 2000–3000 ppm.

Examples of anthraquinone disulphonic acid isomers which may be used, singly or in combination, include anthraquinone -1:5-, -1:6-, -1:7-, -1:8-, -2:6- and -2:7- disulphonic acids, as well as commercially-available mixtures thereof, e.g. mixtures of anthraquinone -2:6- and -2:7- and of -1:5- and -1:8- disulphonic acids. Other anthraquinone disulphonic acids which may be used are the products of the direct sulphonation of alkyl- or halogenated- anthraquinones of formula:

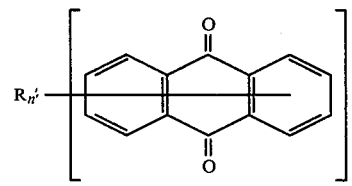

wherein $n'$ is from 1 to 4 and $R'$ is the same or different alkyl having from 1 to 4 carbon atoms or a chlorine atom, at least one group $R'$ being alkyl, there being 1–3 substituents when only one ring is substituted and 1–2 substituents per ring when both rings are substituted. These sulphonated alkyl-anthraquinones and their carboxylic derivatives are described in Belgian Pat. No. 846038 and British Pat. No. 1508268. The sulphonamide derivatives of anthraquinone disulphonic acids, which may be used as component (a) of the solution used in the process of the present invention are fully described, as is their production, in our copending U.S. Patent Applications Ser. Nos. 57,154 and 57,157. The anthraquinone sulphonamides have the general formula

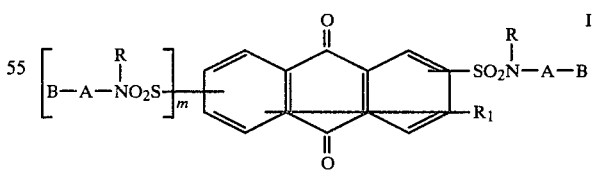

where A is a $C_1$–$C_4$ straight or branched chain alkylene radical, B is a —$SO_3M$, —$CO_2M$, —$PO_3HM$ or —$PO_3M_2$ grouping, M is hydrogen, or a cation giving a water-soluble derivative, R is hydrogen, a cation giving a water-soluble derivative or a $C_1$–$C_4$ straight or branched chain alkyl, $R_1$ is hydrogen, methyl or —COOH, and m is 0 or 1.

Where M or R is a cation giving a water-soluble derivative this is preferably an alkali metal for example sodium or potassium or an unsubstituted or substituted ammonium cation, for example, ammonium or optionally substituted $C_1$–$C_6$ alkylammonium, examples of alkyl substituents being methyl, ethyl, propyl, butyl or mono-, di- or tri-hydroxyethyl.

Preferably B is a —$SO_3M$ grouping, $R_1$ is hydrogen and M and R are hydrogen, sodium, potassium or ammonium.

More preferably $R_1$ is hydrogen, M and R are hydrogen, sodium, potassium or ammonium and A is a $C_1$–$C_4$ straight chain alkylene radical.

Especially preferred compounds are those where $R_1$ is hydrogen, M and R are hydrogen, sodium, potassium or ammonium and A is methylene or ethylene and m is 1.

Further Examples of compounds of general formula I include the alkali metal or amine salts of any of the above compounds particularly the sodium, potassium or ammonium salts.

The compounds of formula I where R is H or $C_1$–$C_4$ straight or branched chain alkyl may be prepared by reacting the corresponding anthraquinone sulphonyl halide having the general formula

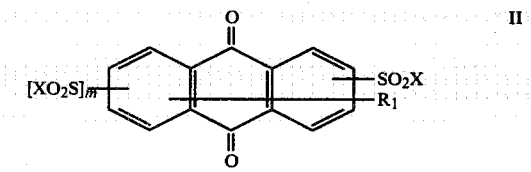

II with a compound having the general formula

III where X is halogen, especially chlorine, $R_2$ is H or $C_1$–$C_4$ straight or branched chain alkyl and A, m, B and $R_1$ have their previous significance.

The reaction may conveniently be carried out by adding the compound of formula III to a solution of the compound of formula II in a solvent system consisting of aqueous alkali and a water-soluble ether at less than 20° C. The reaction time may vary depending on the circumstances but is conveniently from 1 to 12 hours. An example of a water-soluble ether is tetrahydrofuran.

The compound of formula II may be prepared by the method described by Kozlov et al., J. Gen. Chem. Russ 1947, 17, 289.

The compounds of formula I where A is —$CH_2$— may also be prepared by reacting the corresponding anthraquinone sulphonamide having the general formula

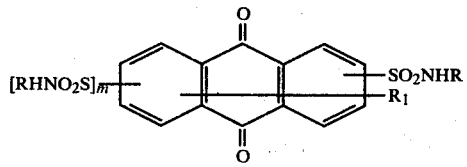

IV with a compound having the general formula

V where m, B, R and $R_1$ have their previous significance.

The reaction may conveniently be carried out by adding a compound of formula IV to a solution of a compound of formula V in water and heating at a temperature up to 100° C. The reaction time may vary depending upon the circumstances, but is conveniently from 1 to 12 hours. The temperature of the reaction is preferably from 60° C. to 80° C.

The compound of formula V where B is —$SO_3Na$ may conveniently be prepared from formaldehyde and sodium bisulphite in aqueous solution at 80° C. In this case the compound of formula I is normally prepared by adding the compound of formula IV to such a solution.

The compounds of formula IV may be prepared by the method described by Tr. Leningr. Khim-Farmatseut, Inst., 1960, 11, 48.

The compound of a metal which can exist in at least two valency states is preferably a compound of vanadium, especially an ortho-, meta- or pyrovanadate of an alkali metal and/or ammonium e.g. sodium ammonium vanadate or sodium metavanadate. The amount of vanadate used is preferably within the range of from 1000–4000 ppm preferably 1500–2500 ppm.

Part, at least, of the vanadium compound may be replaced by one or more metals having at least two valency states e.g. iron, copper, cobalt, chromium, manganese and nickel.

Preferred categories of sequestering agents falling under the definition of formula I are those set out hereinafter:

CATEGORY 1

(Compounds I wherein n=2; and R is a hydroxyl-substituted aliphatic residue), viz. compounds of formula

Ia wherein $R_1$ is hydrogen or an aliphatic residue containing from 1 to 11, preferably 1 to 4 carbon atoms; as well as their water-soluble esters and salts.

Specific examples of compounds of formula Ia are:
1-hydroxyethylidene-1,1-diphosphonic acid
1-hydroxypropylidene-1,1-diphosphonic acid
1-hydroxybutylidene-1,1-diphosphonic acid
1-hydroxyamylidene-1,1-diphosphonic acid Preferred examples of compounds Ia are:
1-hydroxyethylidene-1,1-diphosphonic acid
1-hydroxypropylidene-1,1-diphosphonic acid

CATEGORY 2

(Compound I wherein n is 1, 2, 3 or 4; and R is an aliphatic residue substituted by one or more carboxylic acid groups).viz. Compounds of formula:

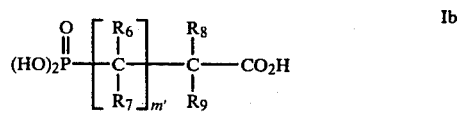

Ib wherein m' is 0 or 1; and, when m' is 0, $R_8$ and $R_9$ are the same or different and each is hydrogen, an alkyl group having from 1 to 4 carbon atoms, a benzyl group, an allyl group, a —CH$_2$PO$_3$H$_2$ group, a —CH(COOH)CH$_2$COOH group, a group of formula —CH$_2$CH(R$_{10}$)Z wherein R$_{10}$ is hydrogen, methyl, —CH$_2$COOH or —CH$_2$CH$_2$COOH and Z is —COOH or —PO$_3$H$_2$; or R$_8$ is hydrogen, an alkyl-, alkenyl- or alkynyl group having from 1 to 4 carbon atoms, a phenyl group; a cycloalkyl group having from 3 to 6 carbon atom, a benzyl or phenethyl group, or a residue of formula —CH(R$_{11}$)—CH(R$_{12}$)—COOH wherein R$_{11}$ is hydrogen, an alkyl group having from 1 to 4 carbon atoms or —COOH and R$_{12}$ is hydrogen or methyl, and R$_9$ is —CH$_2$CO$_2$H; or R$_8$ is hydrogen and R$_9$ is hydroxy and when m, is 1, R$_6$ and R$_7$ are the same or different and each is hydrogen, methyl or phenyl with the proviso that R$_6$ and R$_7$ are not the same when R$_6$ is phenyl, R$_8$ is hydrogen, and R$_9$ is hydrogen, an alkyl group having from 1 to 4 carbon atoms or a —CH$_2$CH$_2$COOH group, or R$_8$ and R$_9$ together form a methylene group (=CH$_2$); or R$_6$ is hydrogen or methyl, R$_7$ is CO$_2$H or PO$_3$H$_2$, R$_8$ is hydrogen and R$_9$ is —CH$_2$CO$_2$H, or when R$_8$ and R$_9$ are hydrogen, R$_6$ is a —CH$_2$CH$_2$CO$_2$H and R$_7$ is a PO$_3$H$_2$ group.

Specific Examples of compounds of formula Ib include:
1-Phosphonoethane-1,2-dicarboxylic acid
2-phosphonoacetic acid
2-phosphonopropionic acid
2-phosphonohexanoic acid
3-phenyl-2-phosphonopropionic acid
2-phosphonopent-4-enoic acid
2-methyl-3-phosphonopropionic acid
2-butyl-2-phosphonohexanoic acid
2-methyl-2-phosphonohexanoic acid
2-methyl-3-phenyl-2-phosphonopropionic acid
2,3-diphosphonopropionic acid
1-phosphonopropane-1,2,3-tricarboxylic acid
2-phosphonopropane-1,2,3-tricarboxylic acid
3,3-diphosphonopentane-1,5-dicarboxylic acid
1-phosphonopropane-1,3-dicarboxylic acid
3-methyl-1-phosphonopropane-1,3-dicarboxylic acid
1-phosphonobutane-1,3,4-tricarboxylic acid
1-phosphonopentane-1,3,5-tricarboxylic acid
2,4-diphosphonobutyric acid
4-methyl-2,4-diphosphonobutyric acid
3-phosphonopentane-1,3,5-tricarboxylic acid
5-phosphonononane-1,3,5,7,9-pentacarboxylic acid
3-phosphonoheptane-1,3-dicarboxylic acid
1-phenyl-2-phosphonobutane-2,4-dicarboxylic acid
3-phosphonopropionic acid
3-phosphonobutanoic acid
3-methyl-3-phosphonobutanoic acid
3-phenyl-3-phosphonopropionic acid
2-methyl-3-phosphonopropionic acid
2-butyl-3-phosphonopropionic acid
1-phosphonobutane-2,4-dicarboxylic acid
2-phosphonomethylacrylic acid
2-phosphonobutane-1,2,4-tricarboxylic acid Less preferred compounds Ib are those wherein groups R$_7$, R$_8$ and R$_9$ contain PO$_3$H$_2$.

Examples of preferred compounds of formula Ib are:
3-phenyl-2-phosphonopropionic acid
2,3-diphosphonopropionic acid
1-phosphonpropane-1,2,3-tricarboxylic acid
3,3-diphosphonopentane-1,5-dicarboxylic acid and
2-phosphonomethacrylic acid
Hydroxyphosphonoacetic acid Examples of most preferred compounds Ib are:
1-phosphonoethane-1,2-dicarboxylic acid 2-phosphonoacetic acid
2-phosphonopropionic acid
2-methyl-3-phosphonopropionic acid
2-phosphonopropane-1,2,3-tricarboxylic acid
3-phosphonopropionic acid and
2-phosphonobutane-1,2,4-tricarboxylic acid

CATEGORY 3

(Compounds I wherein n=1 or 2; and R is 1-7 C alkyl or alkylidene), viz. compounds of formula:

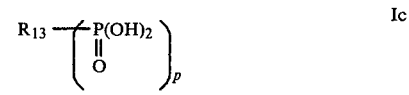

wherein R$_{13}$ is an alkyl or alkylidene residue having from 1 to 7 carbon atoms and optionally substituted by one or more oxygen or nitrogen atoms or carboxyl groups and p is 1 or 2.

Specific examples of compounds of formula Ic are:
methanephosphonic acid
methanephosphonic acid monomethyl ester
methane phosphonic acid monoethyl ester
methane phosphonic acid monosodium salt
ethane phosphonic acid
butane phosphonic acid
methane-1:2-diphosphonic acid
ethane-1:2-diphosphonic acid and
butane-1:4-diphosphonic acid.

Preferred compounds of formula Ic are:
methanephosphonic acid,
methane-1,2-diphosphonic acid and
ethane-1,2-diphosphonic acid, as well as their water-soluble mono-esters and salts.

CATEGORY 4

Compounds of formula I where n is 1 and R is an alkyl residue containing from 1 to 6 carbon atoms substituted by a carbonyl group viz. Compounds of formula

Specific examples of Compounds Id are:
1-Oxoethanephosphonic acid
1-Oxopropanephosphonic acid
1-Oxobutanephosphonic acid
1-Oxopentanephosphonic acid
1-Oxohexanephosphonic acid
1-Oxoheptanephosphonic acid Particularly preferred compounds of formula I are:
1:1-hydroxyethylidene diphosphonic acid (and its dimethyl and diethyl esters and di-water soluble salts) and methane phosphonic acid (and its monomethyl and monoethyl esters and its mono water-soluble salts.) The amount of the component (c) used in the process of the present invention is preferably within the range of from 10 to 7000 ppm, more especially within the range of from 200 to 4000 ppm.

The compounds of formula I may be used in the form of the free acids or as the corresponding water-soluble esters or salts e.g. their alkali metal or ammonium salts.

The acids of formula Ia wherein X is OH are known compounds and may be prepared by reacting phosphorous acid or PCl$_3$ with the appropriate acylating agent and then steam-distilling the product. Methods of producing compounds of formula Ib are described in German Offenlegungsschrift No. 2632774. Compounds of formula Ic may be prepared by the method described in U.S. Pat. No. 2644002. Compounds of formula Id may be prepared from their readily available esters by the method described in Synthesis, 1978, page 609.

As already stated, advantages of the new process using a sequestering agent containing a phosphonic acid group are the stability of the sequestering agent to oxidation during the process and its more efficient metal-sequestering action, relative to sequestering agents known to be used in the Stretford Process.

Sulphur precipitated during the process of the invention may be recovered by any conventional technique, e.g. filtration, before, during or after regeneration of the alkaline treatment solution. The sulphur so recovered can be used e.g. in sulphuric acid plants.

The process of the present invention can be applied successfully to any gas or liquid medium contaminated with hydrogen sulphide. Of particular interest, however, is the purification of coal gas, town gas, waste gas streams as well as liquid hydrocarbon streams containing hydrogen sulphide.

The following Examples further illustrate the present invention.

EXAMPLES 1, 2 AND 3

General Test Method

A buffered solution of the sequestrant under test in water containing metallic iron (in the form of an iron bar or coupon) was stirred at 50° during 56 hours. Oxygen was bubbled through the solution continuously, the pH being maintained at 8.5 to 9.5 with gaseous $CO_2$. The sequestrant level was measured before/after oxidation.

Citric acid (Comparative Example)

30.6 Parts trisodium citrate dihydrate, 1.13 parts sodium carbonate, and 1.36 parts sodium bicarbonate was dissolved in 100 parts water and treated with oxygen in the presence of 4.8 parts of an iron bar as described in the general method. Analysis of the solution before and after oxidation showed a loss of 9.9% citric acid (analysed as the free acid) after 56 hours.

Ethylene diamine tetraacetic acid (Comparative Example)

30.6 Parts disodium ethylene diaminetetraacetic acid and dihydrate, 2.8 parts sodium carbonate, and 3.4 parts sodium bicarbonate were dissolved in 250 parts water. 100 Parts of the resulting solution were treated with oxygen in the presence of 4.8 parts of an iron bar as described in the general method. Analysis of the solution before and after oxidation showed a loss of 18.6% ethylenediamine tetraacetic acid (analysed as the free acid) after 56 hours.

1-hydroxyethylidene-1,1-diphosphonic acid (Example 1)

25 Parts 1-hydroxyethylidene-1,1-diphosphonic acid were dissolved in 150 parts water and the pH adjusted to 9 with 8 N sodium hydroxide. 1.1 parts sodium carbonate and 1.36 parts sodium bicarbonate were added and the resulting solution diluted to 250 parts with water. 100 parts of this solution were treated with oxygen in the presence of 4.8 parts of an iron bar as described in example 1. Analysis of the solution before and after oxidation showed that no breakdown of the 1-hydroxyethylidene-1,1-diphosphonic acid had occurred.

Methane phosphonic acid (Example 2)

25 parts methanephosphonic acid were dissolved in 150 parts water and the pH adjusted to 9 with 8 N sodium hydroxide. 1.1 Parts sodium carbonate and 1.36 parts sodium bicarbonate were added and the resulting solution diluted to 250 parts with water. 100 parts of this solution were treated with oxygen in the presence of 4.8 parts of an iron bar as described in example 1. Analysis of the solution before and after oxidation showed that no breakdown of the methane phosphonic acid had occurred.

2-Phosphonobutane-1,2,4-tricarboxylic acid (Example 3)

25 Parts 2-phosphonobutane-1,2,4-tricarboxylic acid were dissolved in 150 parts water and the pH adjusted to 9 with 8 N sodium hydroxide. 2.8 Parts sodium carbonate and 3.4 parts sodium bicarbonate were added and the resulting solution diluted to 250 parts with water. 100 Parts of this solution were treated with 4.8 parts of an iron bar as described in Example 1. Analysis of the solution before and after oxidation showed that 3% breakdown of the 2-phosphonobutane-1,2,4-tricarboxylic acid had occurred.

The citric acid levels were determined by oxidation of the citric acid to bromoform which was estimated by glc techniques. The phosphonic acids were analysed by $^{31}p$ nmr and organic phosphorus versus inorganic phosphate content of the solutions.

EXAMPLE 4

Vanadium Sequestering Test 500 mls of a test solution was made up containing:

| | |
|---|---|
| $Na_2CO_3$ | 5.65g |
| $NaHCO_3$ | 6.8g |
| $Na_2S_2O_3$ | 50.0g |
| NaSCN | 40.0g |
| Na $VO_3$ | 1.85 |

Sequestering agent under test

This solution then contains 1.5 g/l of vanadium which at 2:1 vanadium:$H_2S$ requires 0.25 g $H_2S$ in 500 mls of solution to convert $V^{5+}$ to $V^{4+}$. 125 ml $H_2S$ is bubbled into the solution which is equivalent to 0.19 g $H_2S$ and therefore gives approximately 75% $V^{4+}$ and 25% $V^{5+}$.

These conditions are ideal for the formulation of black vanadate/vanadyl complex. The test solutions are allowed to stand for 2 days and any black precipitate produced filtered on a 15 cm No. 1 Whatman paper and the amount of precipitate estimated visually.

The test is carried out at various concentrations of sequestering agent in order to determine the minimum amount of sequestering agent required to prevent the formation of the black precipitate. This concentration is taken as the minimum amount of sequestering agent required to give effective Vanadium Sequestration.

The results obtained are shown in the following Table.

| Example | Sequestering Agent | Amount of sequestering agent required to give a 1:1 mol ratio of V: sequestering agent | Minimum amount required of sequestering agent to give effective V sequestration |
|---|---|---|---|
| — | Trisodium dihydrate of citric acid | 4.3g | 9.0g |
| 4 | 1-hydroxyethylidene-1,1-diphosphonic acid | 5.2g | 2.1g |

These results indicate that 2 mols of citric acid sequester 1 mol of vanadium whereas 1 mol of 1:1-hydroxyethylidene diphosphonic acid sequesters 2 mols of vanadium so that the latter is a much more effective sequestering agent than citric acid in this application.

What we claim is:

1. A process for the removal of hydrogen suphide from gases or liquid hydrocarbons, comprising contacting the gas or liquid hydrocarbons with an aqueous alkaline solution which comprises:

(a) an anthraquinone disulphonic acid or a sulphonamide thereof
   (b) a compound of a metal which can exist in at least two valency states and,
   (c) a sequestering agent comprising a compound of formula I:

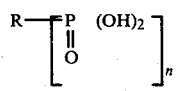

wherein
   R is an aliphatic residue containing from 1 to 12 carbon atoms and which is optionally substituted or interrupted by one or more hydroxy, or carboxyl groups, a carbonyl group a phenyl group, or an aralkyl group containing 7 to 10 carbon atoms; and
   n is an integer from 1 to 4; as well as the water-soluble salts and esters of compounds of formula I.

2. A process as claimed in claim 1 wherein the alkaline solution has a pH value of from 8 to 10.

3. A process as claimed in claim 1 or 2 wherein the salt of the compound of formula I is an alkali metal or ammonium salt.

4. A process as described in claim 1 wherein the amount of component (a) is from 1000 to 4000 ppm.

5. A process as claimed in claim 4 wherein the amount of component (a) is from 2000 to 3000 ppm.

6. A process as claimed in claim 1 wherein the component (a) is one or more of anthraquinone-1:5-, -1:6-, -1:7-, -1:8-, -2:6- and -2:7-disulphonic acids; as well as mixtures of anthraquinone -2:6- and -2:7- acids or of -1:5-, and -1:8-disulphonic acids.

7. A process as claimed in claim 1 wherein the component (a) is a product of the direct sulphonation of a compound of formula:

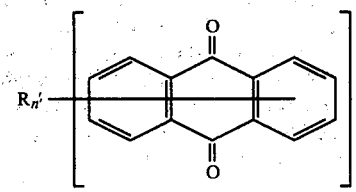

wherein
   n' is from 1 to 4 and R' is the same or different alkyl group having from 1 to 4 carbon atoms or a chlorine atom; at least one group R' being alkyl and there being 1-3 substituents when only one ring is substituted and 1-2 substituents per ring when both rings are substituted.

8. A process as claimed in claim 1 wherein component (b) is a compound of vanadium.

9. A process as claimed in claim 8 wherein the compound of vanadium is an ortho-, meta- or pyrovanadate of an alkali metal, ammonium or mixture thereof.

10. A process as claimed in claim 8 wherein the amount of vanadate used is from 1000 to 4000 ppm.

11. A process as claimed in claim 10 wherein the amount of vanadate used is from 1500 to 2500 ppm.

12. A process as claimed in claim 1 wherein component (c) is a compound of formula:

wherein $R_1$ is hydrogen or an aliphatic residue containing from 1 to 11 carbon atoms; and their water-soluble esters and salts.

13. A process as claimed in claim 12 wherein $R_1$ is an aliphatic residue having from 1 to 4 carbon atoms.

14. A process as claimed in claim 12 wherein the compound of formula Ia is 1-hydroxyethylidene-1,1-disphosphonic acid or its dimethyl- or diethyl ester or its di-water-soluble salts, 1-hydroxypropylidene-1,1-diphosphonic acid, or methane phosphonic acid or its monomethyl- or monoethyl ester or its mono-water-soluble salts.

15. A process as claimed in claim 1 wherein component (c) is a compound of formula:

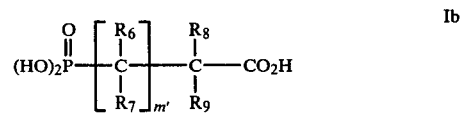

wherein m' is 0 or 1; and, when m' is 0, $R_8$ and $R_9$ are the same or different and each is hydrogen, an alkyl group having from 1 to 4 carbon atoms, a benzyl group, an alkyl group, a —$CH_2PO_3H_2$ group, —CH(COOH)CH$_2$COOH group, a group of formula —$CH_2CH(R_{10})Z$ wherein $R_{10}$ is hydrogen, methyl, —$CH_2COOH$ or —$CH_2CH_2COOH$ and Z is —COOH or —$PO_3H_2$; or $R_8$ is hydrogen an alkyl-, alkenyl- or alkynyl group having from 1 to 4 carbon atoms, a phenyl group, a cycloalkyl group having from 3 to 6 carbon atoms, a benzyl or phenethyl group, or a residue of formula —CH($R_{11}$)—CH—($R_{12}$)—COOH wherein $R_{11}$ is hydrogen, an alkyl group having from 1 to 4 carbon atoms a —COOH and $R_{12}$ is hydrogen or methyl; and $R_9$ is —$CH_2CO_2H$; and when m' is 1, $R_6$ and $R_7$ are the same or different and each is hydrogen, methyl or phenyl, with the proviso that $R_6$ and $R_7$ are not the same when $R_6$ is phenyl; $R_8$ is hydrogen; and $R_9$ is hydrogen, an alkyl group having from 1 to 4 carbon atoms or a —$CH_2CH_2COOH$ group; or $R_8$ and $R_9$ together form a methylene (=$CH_2$) group; or $R_6$ is hydrogen a methyl; $R_7$ is —$CO_2H$ or —$PO_3H_2$; $R_8$ is hydrogen; and $R_9$ is —$CH_2CO_2H$, or when $R_8$ and $R_9$ are hydrogen, $R_6$ is a —$CH_2CH_2COOH$ and $R_7$ is a $PO_3H_2$ group.

16. A process as claimed in claim 15 wherein the compound Ib is
1-phosphonoethane-1,2-dicarboxylic acid,
2-phosphonoacetic acid,
2-phosphonopropionic acid,
2-methyl-3-phosphonopropionic acid,
2-phosphonopropane-1,2,3-tricarboxylic acid,
3-phosphonopropionic acid or
2-phosphonobutane-1,2,4-tricarboxylic acid.

17. A process as claimed in claim 1 wherein component (c) is a compound of formula:

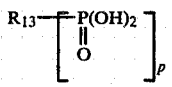

wherein $R_{13}$ is an alkyl or alkylidene residue having from 1 to 7 carbon atoms optionally substituted by one or more oxygen or nitrogen atoms or carboxyl groups; and p is 1 or 2; as well as their mono-esters and their water-soluble salts.

18. A process as claimed in claim 17 wherein the compound of formula Ic is:
methanephosphonic acid,
methane-1,2-diphosphonic acid, or
ethane-1,2-diphosphonic acid;
monoester or water-soluble salt thereof.

19. A process as claimed in claim 1 wherein component (c) is a compound of formula:

$$RCPO_3H_2 \quad \text{Id}$$
$$\parallel$$
$$O$$

where R is an alkyl residue containing from 1 to 6 carbon atoms.

20. A process as claimed in claim 19 wherein the compound of formula Id is:
1-oxoethane phosphonic acid,
1-oxopropane phosphonic acid,
1-oxobutane phosphonic acid,
1-oxopentane phosphonic acid,
1-oxohexane phosphonic acid,
1-oxoheptane phosphonic acid, 21. A process as claimed in claim 1 wherein the amount of component(c) is from 10 to 7000 ppm.

22. A process as claimed in claim 21 wherein the amount of component (c) is from 200 to 4000 ppm.

23. A process according to claim 1 wherein component (a) is a sulphonamide of an anthraquinone disulphonic acid having the formula

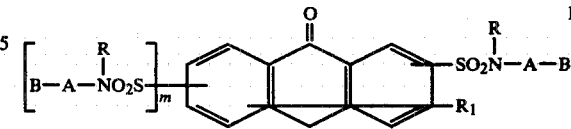

wherein
A is a $C_1$-$C_4$ straight or branched chain alkylene radical
B is a —$SO_3M$, —$CO_2M$, —$PO_3HM$ or —$PO_3M_2$ grouping,
M is hydrogen or a cation giving a water-soluble derivative
R is hydrogen, a cation giving a water-soluble derivative or a $C_1$-$C_4$ straight or branched chain alkyl,
$R_1$ is hydrogen, methyl or —COOH, and m is 0 or 1.

* * * * *

UNITED STATES PATENT AND TRADEMARK OFFICE
CERTIFICATE OF CORRECTION

PATENT NO. : 4,251,492
DATED : FEBRUARY 17, 1981
INVENTOR(S) : ALAN MARSHALL

It is certified that error appears in the above-identified patent and that said Letters Patent are hereby corrected as shown below:

Claim 20, Column 12, Lines 14 and 15 read:

"1-oxohexane phosphonic acid,
 1-oxoheptane phosphonic acid,".

Should read:

"1-oxohexane phosphonic acid, or
 1-oxoheptane phosphonic acid."

Signed and Sealed this

Fifth Day of May 1981

[SEAL]

Attest:

RENE D. TEGTMEYER

Attesting Officer    Acting Commissioner of Patents and Trademarks

UNITED STATES PATENT AND TRADEMARK OFFICE
CERTIFICATE OF CORRECTION

PATENT NO. : 4,251,492
DATED : FEBRUARY 17, 1981
INVENTOR(S) : ALAN MARSHALL

It is certified that error appears in the above—identified patent and that said Letters Patent is hereby corrected as shown below:

Cover page, Line 30, Foreign Application Priority Data reads:

" [30] Foreign Application Priority Data

Jun. 7, 1978 [GB] United Kingdom......26466/78."

Should read:

" [30] Foreign Application Priority Data

July 21, 1978 [GB] United Kingdom.....30843/78."

Signed and Sealed this

Fifteenth Day of September 1981

[SEAL]

Attest:

GERALD J. MOSSINGHOFF

Attesting Officer     Commissioner of Patents and Trademarks